United States Patent
McEvoy et al.

(10) Patent No.: US 10,302,222 B2
(45) Date of Patent: May 28, 2019

(54) DYNAMIC STEM PACKING

(71) Applicant: GE Oil & Gas Pressure Control LP, Houston, TX (US)

(72) Inventors: Travis Kyle McEvoy, Houston, TX (US); Keith M. Adams, Katy, TX (US); Lloyd R. Cheatham, Lake Jackson, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 0 days.

(21) Appl. No.: 15/864,150

(22) Filed: Jan. 8, 2018

(65) Prior Publication Data

US 2018/0128396 A1    May 10, 2018

Related U.S. Application Data

(63) Continuation of application No. 14/947,213, filed on Nov. 20, 2015, now Pat. No. 9,863,551.

(60) Provisional application No. 62/095,402, filed on Dec. 22, 2014.

(51) Int. Cl.
| | |
|---|---|
| *F16K 41/02* | (2006.01) |
| *F16K 41/04* | (2006.01) |
| *F16K 41/16* | (2006.01) |

(52) U.S. Cl.
CPC .............. *F16K 41/02* (2013.01); *F16K 41/04* (2013.01); *F16K 41/16* (2013.01)

(58) Field of Classification Search
CPC .......... F16K 41/02; F16K 41/16; F16K 41/04; F16K 41/023; F16K 41/026; F16K 41/063; F16K 41/066; F16K 41/06

USPC ........................................................ 251/214
See application file for complete search history.

(56) References Cited

U.S. PATENT DOCUMENTS

| | | | | |
|---|---|---|---|---|
| 2,809,059 | A | * | 10/1957 | Hillis ....................... F16K 41/02 137/315.27 |
| 3,476,358 | A | | 11/1969 | Westerlund et al. |
| 3,529,804 | A | * | 9/1970 | Perrin ........................ F16K 3/22 251/214 |
| 4,230,299 | A | | 10/1980 | Pierce, Jr. |
| 5,107,882 | A | * | 4/1992 | Carroll ..................... F16K 27/02 137/315.28 |
| 2003/0116732 | A1 | | 6/2003 | Chatufale |
| 2004/0135112 | A1 | | 7/2004 | Greeb et al. |

(Continued)

FOREIGN PATENT DOCUMENTS

CA    1321574    1/1989

OTHER PUBLICATIONS

International Search Report and Written Opinion issued in connection with corresponding PCT Application No. PCT/US2015/062893 dated Mar. 1, 2016.

*Primary Examiner* — Marina A Tietjen
(74) *Attorney, Agent, or Firm* — Hogan Lovells US LLP

(57) ABSTRACT

A valve assembly having a dynamic stem seal assembly includes a valve stem for moving a valve member from a closed position to an open position, the valve stem extending through a stem opening of a valve assembly body and having an axis. A packing assembly seals between the valve stem and the stem opening. The packing assembly has a seal assembly circumscribing the valve stem. The packing assembly also has a packing retainer assembly releasably secured to the valve stem. The packing assembly is axially static relative to the valve stem.

20 Claims, 5 Drawing Sheets

(56) References Cited

U.S. PATENT DOCUMENTS

| | | | |
|---|---|---|---|
| 2005/0151107 A1* | 7/2005 | Shu | F16K 3/243 251/214 |
| 2006/0208211 A1* | 9/2006 | Bush | F16K 41/02 251/214 |
| 2011/0006234 A1 | 1/2011 | Schade | |
| 2013/0161553 A1 | 6/2013 | Hunter | |

* cited by examiner

DYNAMIC STEM PACKING

CROSS REFERENCE TO RELATED APPLICATIONS

This application is a continuation of U.S. patent application Ser. No. 14/947,213, filed Nov. 20, 2015, titled "Dynamic Stem Packing," which claims priority to and the benefit of U.S. Provisional Application Ser. No. 62/095,402 filed Dec. 22, 2014, titled "Dynamic Stem Packing;" the full disclosures which are hereby incorporated herein by reference in their entireties for all purposes.

BACKGROUND

1. Field of Disclosure

This disclosure relates in general to a valve assembly, and in particular to packings that circumscribe a rotating or translating stem of the valve assembly.

2. Description of Related Art

Valve stems that are used to actuate valves can move either axially or can rotate to move the valve between an open and closed position. In order to prevent fluids from within the valve from escaping past the valve stem, a stem packing is provided that seals between an outer diameter of the valve stem and an inner diameter of a portion of the valve assembly, such as a bonnet that is located between the valve and the actuator.

In some current stem packing assemblies, material is removed from the bonnet to provide a recess in the bonnet to house the stem packing. The stem packing can be retained with the bonnet with a retainer nut. The retainer nut can be threaded to internal threads of the bonnet. The stem packing is static relative to the bonnet, as the valve stem moves axially or rotates.

SUMMARY OF THE DISCLOSURE

Embodiments of the current disclosure provide a stem packing that moves with the stem. Systems and methods described herein reduce the need to remove material from the bonnet to accommodate the packing and packing retainer, compared to current stem packing systems. Threads for engaging the retainer nut are not locating in the bonnet, but instead located on the stem. Because the retainer nut is recessed below the top of the bonnet, rather than being partially located above the bonnet, the length of the stem can be reduced. In addition, because the stem packing is located in a recessed portion of the stem rather than being located exterior to an outer diameter of the stem, the volume of the annular space between the stem and the bonnet can be reduced, decreasing the volume of cladding required, when cladding is used.

In an embodiment of this disclosure a valve assembly having a dynamic stem seal assembly includes a valve stem for moving a valve member from a closed position to an open position. The valve stem extends through a stem opening of a valve assembly body and having an axis. A packing assembly seals between the valve stem and the stem opening. The packing assembly has a seal assembly circumscribing the valve stem at a portion of the valve stem with a reduced outer diameter. A packing retainer assembly is releasably secured to the valve stem at the portion of the valve stem with the reduced outer diameter. The packing assembly is axially static relative to the valve stem.

In an alternate embodiment of this disclosure, a valve assembly having a dynamic stem seal assembly includes a valve stem extending through a stem opening of a bonnet and having an axis. A packing assembly seals between the valve stem and the stem opening. The packing assembly has a seal assembly circumscribing the valve stem at a portion of the valve stem with a reduced outer diameter. A packing retainer assembly is releasably secured to the valve stem at the portion of the valve stem with the reduced outer diameter. The seal assembly is positioned axially between an upward facing annular shoulder of the valve stem and an end surface of the packing retainer assembly. The packing assembly is axially static relative to the valve stem.

In yet another embodiment of this disclosure, a method for sealing an annular space within a valve assembly with a dynamic stem seal assembly includes providing a packing assembly for sealing between a valve stem and a stem opening of a valve assembly body. The valve stem extends through the stem opening and has an axis. The valve stem of the valve assembly is circumscribed with a seal assembly of the packing assembly at a portion of the valve stem with a reduced outer diameter. A packing retainer assembly of the packing assembly is releasably secured to the valve stem at the portion of the valve stem with the reduced outer diameter so that the packing assembly is retained axially static relative to the valve stem as the valve stem moves a valve member from a closed position to an open position.

BRIEF DESCRIPTION OF THE DRAWINGS

So that the manner in which the features, advantages and objects of the disclosure, as well as others which will become apparent, are attained and can be understood in more detail, more particular description of the embodiments briefly summarized above may be had by reference to the embodiment thereof which is illustrated in the appended drawings, which drawings form a part of this specification. It is to be noted, however, that the drawings illustrate only certain embodiments of the disclosure and is therefore not to be considered limiting of its scope as the disclosure may admit to other equally effective embodiments.

DETAILED DESCRIPTION OF THE DISCLOSURE

Figure 1:
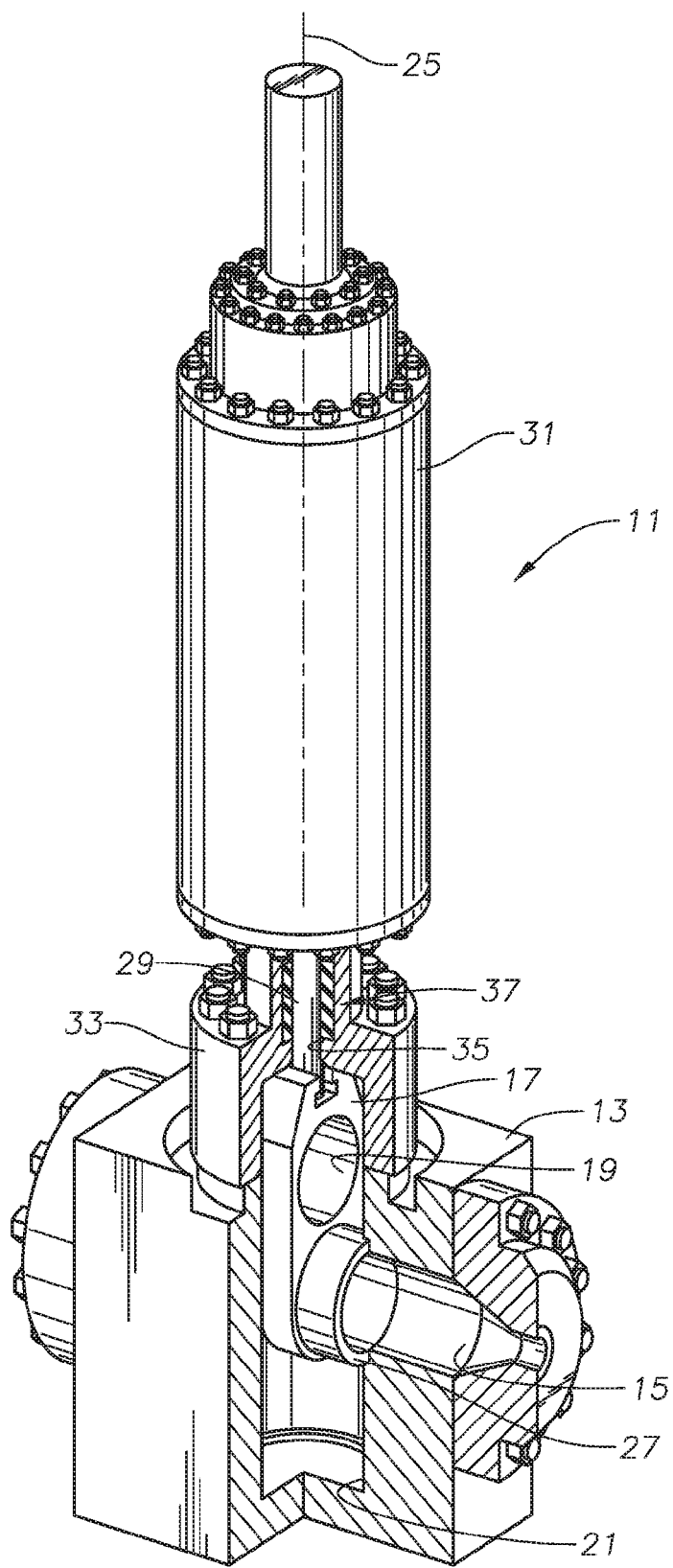
FIG. 1 is a partial quarter section view of a valve assembly with a schematic dynamic stem packing in accordance with an embodiment of this disclosure.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, valve assembly 11 has a valve body 13 and a flow passage 15 that extends transversely through valve body 13. Valve assembly 11 has a valve member 17, such as a gate with a hole 19 there through. Valve assembly 11 shown in FIG. 1 is a rising-stem type valve assembly; however, embodiments of this disclosure can similarly be used on non-rising-stem type valve assemblies. When valve member 17 is in the open position, hole 19 of valve member 17 registers with flow passage 15 of valve body 13 thereby allowing flow through valve assembly 11. When valve member 17 is in the closed position, as shown in FIG. 1, hole 19 no longer registers with flow passage 15, blocking flow of fluid through passage 15 and valve assembly 11. Flow passage 15 intersects a central chamber or cavity 21 located in valve body 13. A counter bore is formed in flow passage 15 at each intersection with cavity 21. A seat ring 27 is located in each counter bore to seal flow passage 15 to valve member 17 while valve member 17 is in the closed position.

Figure 6:
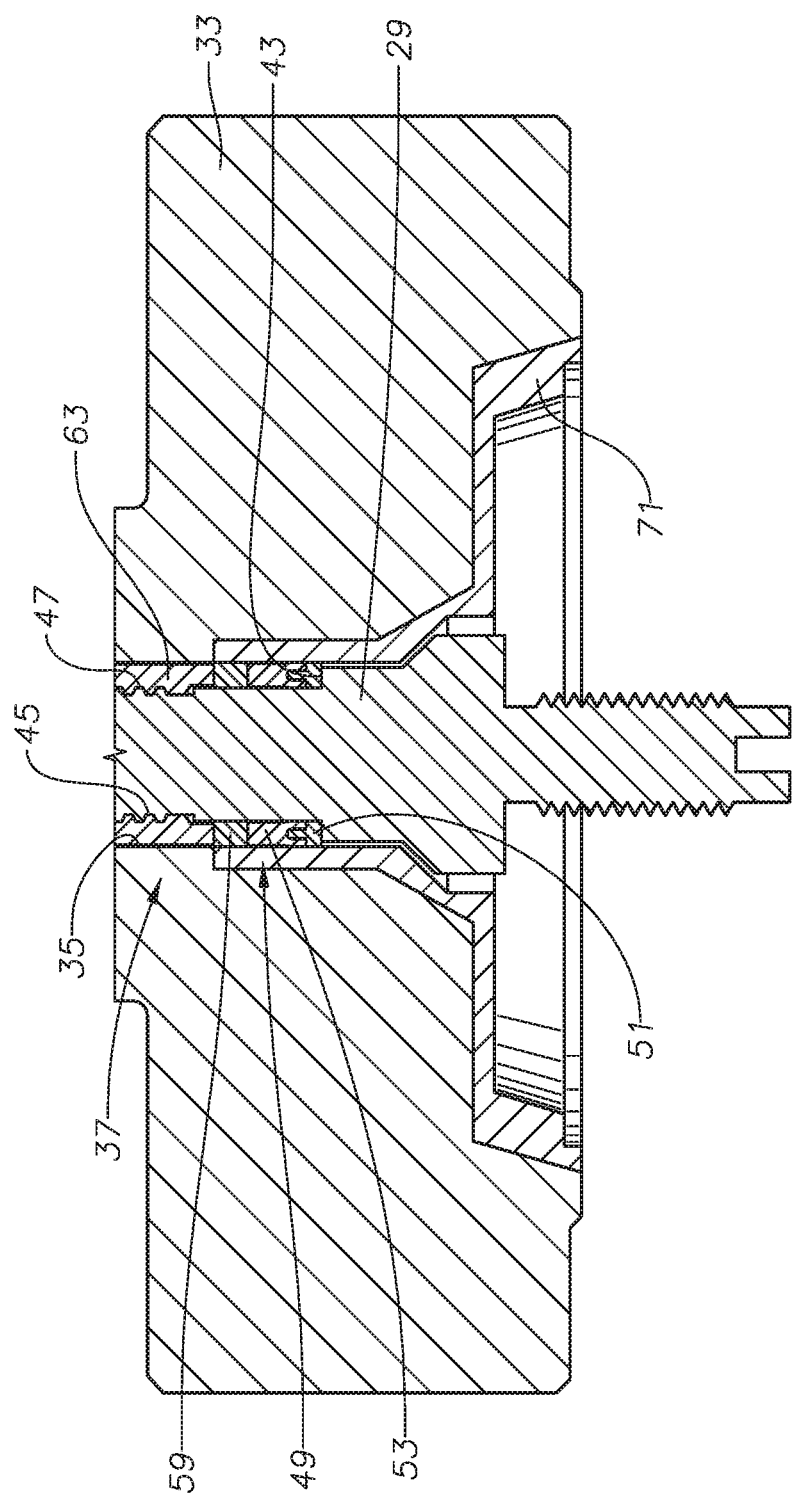
FIG. 6 is a section view of a dynamic stem packing in accordance with an embodiment of this disclosure, shown in a valve bonnet having a rotary stem.

Valve assembly 11 also includes a valve stem 29 coupled to valve member 17. Valve stem 29 has an axis 25 passing through a center of valve stem 29. In certain embodiments, valve stem 29 is linearly moveable without rotation along axis 25 to actuate valve member 17 between the open and closed positions. In alternate embodiments, valve stem 29 is both linearly and rotationally movable relative to axis 25 to actuate valve member 17 between the open and closed positions. In other alternate embodiments, valve stem 29 rotates without linear movement along axis 25 to actuate valve member 17 between the open and closed positions (FIG. 6).

In the illustrated embodiment, actuator 31 couples to valve body 13 around valve stem 29 to bias valve stem 29 and valve member 17 to the closed position. Actuator 31 of FIG. 1 can be hydraulically operated. In alternate embodiments, actuator 31 can be mechanically operated or can be operated by hand, such as with a hand wheel. Looking at FIG. 2, spring 39, which is part of actuator 31, urges downstop 41 in a direction away from valve body 13 so that valve member 17 is biased towards the closed position.

Valve stem 29 extends from valve member 17 to actuator 31 through a valve assembly body, such as bonnet 33. Looking at FIG. 1, bonnet 33 can be located between valve body 13 and actuator 31, acting as a connecting member between valve body 13 and actuator 31. Bonnet 33 can have stem opening 35 centered around axis 25. Valve stem 29 extends from valve member 17 to actuator 31 through stem opening 35. Packing assembly 37 provides sealing for valve stem 29 where valve stem 29 extends through stem opening 35.

Valve assembly 11 can be, for example, associated with a wellhead assembly that is disposed over a well (e.g., an oil well). The wellhead assembly can include a wellhead housing, a production tree over the housing and flow lines connected to the tree or the wellhead assembly. The flow lines and wellhead assembly can include embodiments of valve assembly 11 described herein. Valve assembly 11 can also be used for regulating fluids that are designated for entry into the wellhead assembly or for regulating well and other fluids that are otherwise travelling along a pipeline. A person skilled in the art will understand that valve assembly 11 is an example valve and that the disclosed embodiments contemplate and include any valve having a stem passing through a valve body to operate a valve member located within the valve body.

Figure 2:
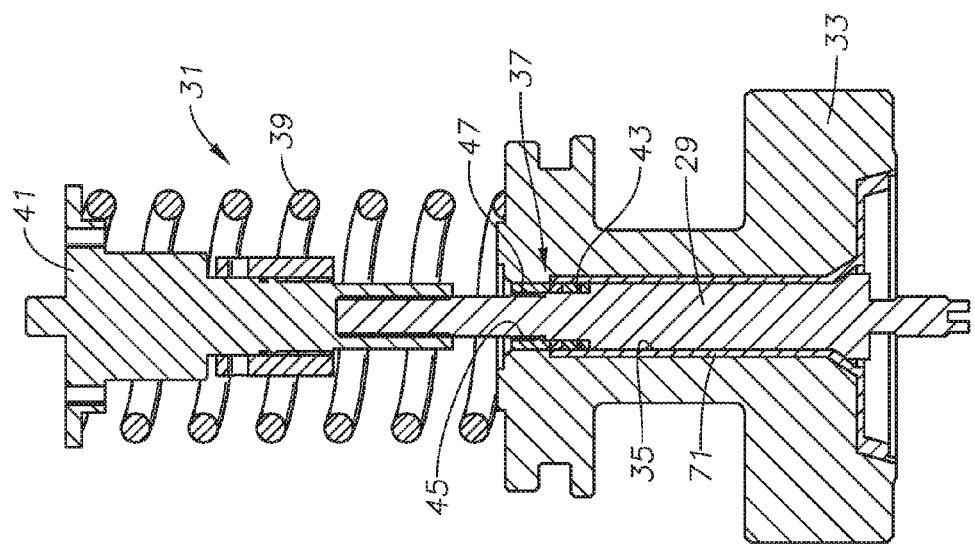
FIG. 2 is section view of a portion of a valve assembly, with a dynamic stem packing in accordance with an embodiment of this disclosure.
Figure 3:
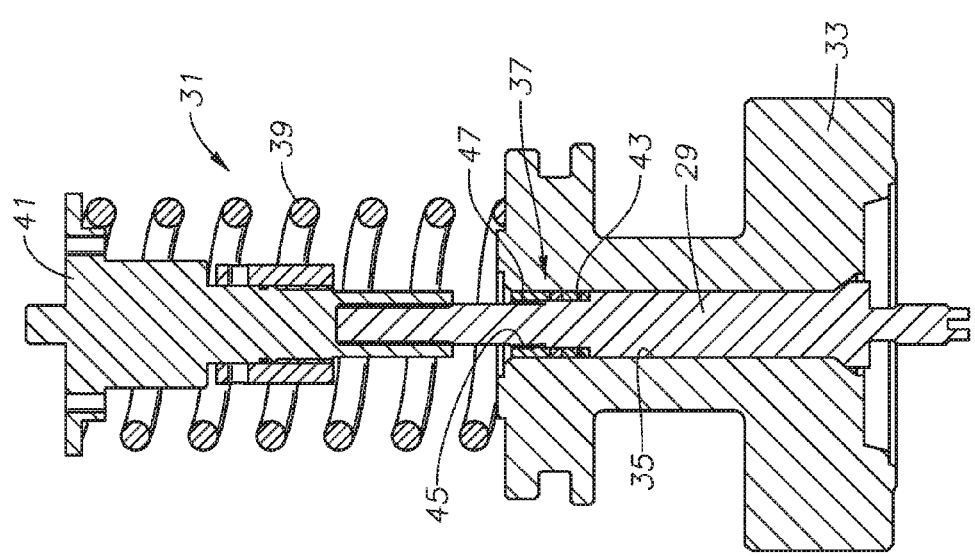
FIG. 3 is section view of a portion of a valve assembly with cladding, with a dynamic stem packing in accordance with an embodiment of this disclosure.

Looking at FIGS. 2-3, packing assembly 37 is located within the annular space between an outer diameter of valve stem 29 and an inner diameter of stem opening 35. Packing assembly 37 seals the annular space between the outer diameter of valve stem 29 and the inner diameter of stem opening 35.

Packing assembly 37 is releasably secured to valve stem 29 at a portion of valve stem 29 with a reduced outer diameter. The portion of valve stem 29 with a reduced outer diameter can be formed by removing material from an outer diameter of valve stem 29. Upward facing annular shoulder 43 can define a lower end of the portion of valve stem 29 with the reduced outer diameter.

Figure 4:
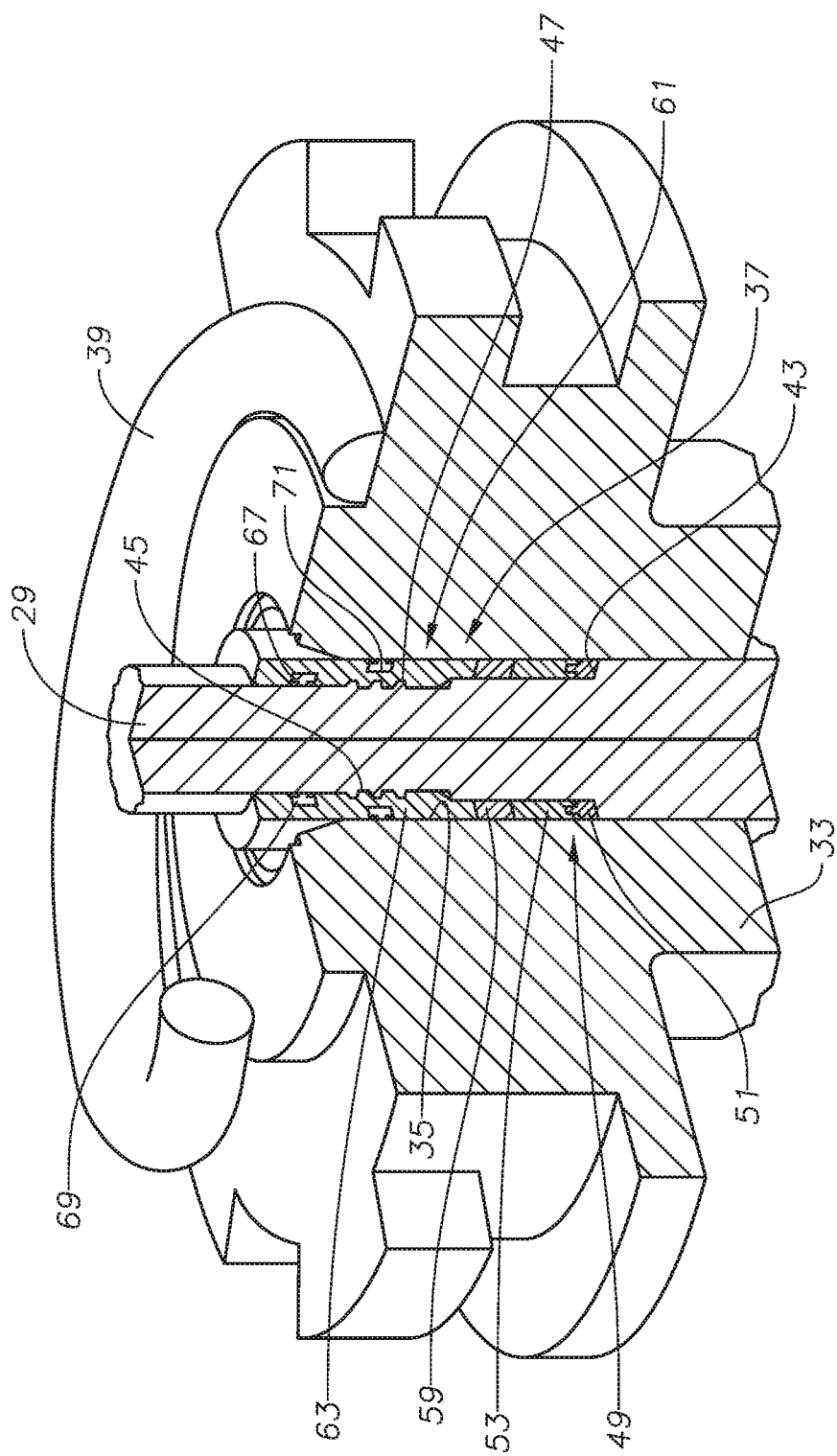
FIG. 4 is a detail quarter section view of a dynamic stem packing, in accordance with an alternate embodiment of this disclosure.

In the example of FIG. 4, inner diameter threads 45 of packing assembly 37 engage outer diameter threads 47 of valve stem 29 to releasably secure packing assembly 37 to valve stem 29. In alternate embodiments, other known connection members can be used to releasable secure packing assembly 37 to valve stem 29. When packing assembly 37 is releasably attached to valve stem 29, packing assembly 37 is axially static relative to valve stem 29 and axially dynamic relative to stem opening 35. Therefore, packing assembly 37 can move axially with valve stem 29 as valve stem 29 moves axially. Packing assembly 37 can rotate about axis 25 with valve stem 29 as valve stem 29 rotates about axis 25, or alternately, packing assembly 37 can be static relative to stem opening 35 as the valve stem rotates 29 about axis 25.

Looking at FIG. 4, packing assembly 37 can include seal assembly 49. Seal assembly 49 circumscribes valve stem 29 at the portion of valve stem 29 with a reduced outer diameter. In the example of FIG. 4, seal assembly 49 includes standoff 51. Standoff 51 engages annular shoulder 43 of valve stem 29. Seal assembly 49 also has seal ring 53 with inner leg 55 and outer leg 57. Inner leg 55 and outer leg 57 are concentric ring shaped members coaxially centered around axis 25. Inner leg 55 is biased radially inward to sealingly engage the outer diameter of valve stem 29. Outer leg 57 is biased radially outward to sealingly engage the inner diameter of stem opening 35.

Figure 5:
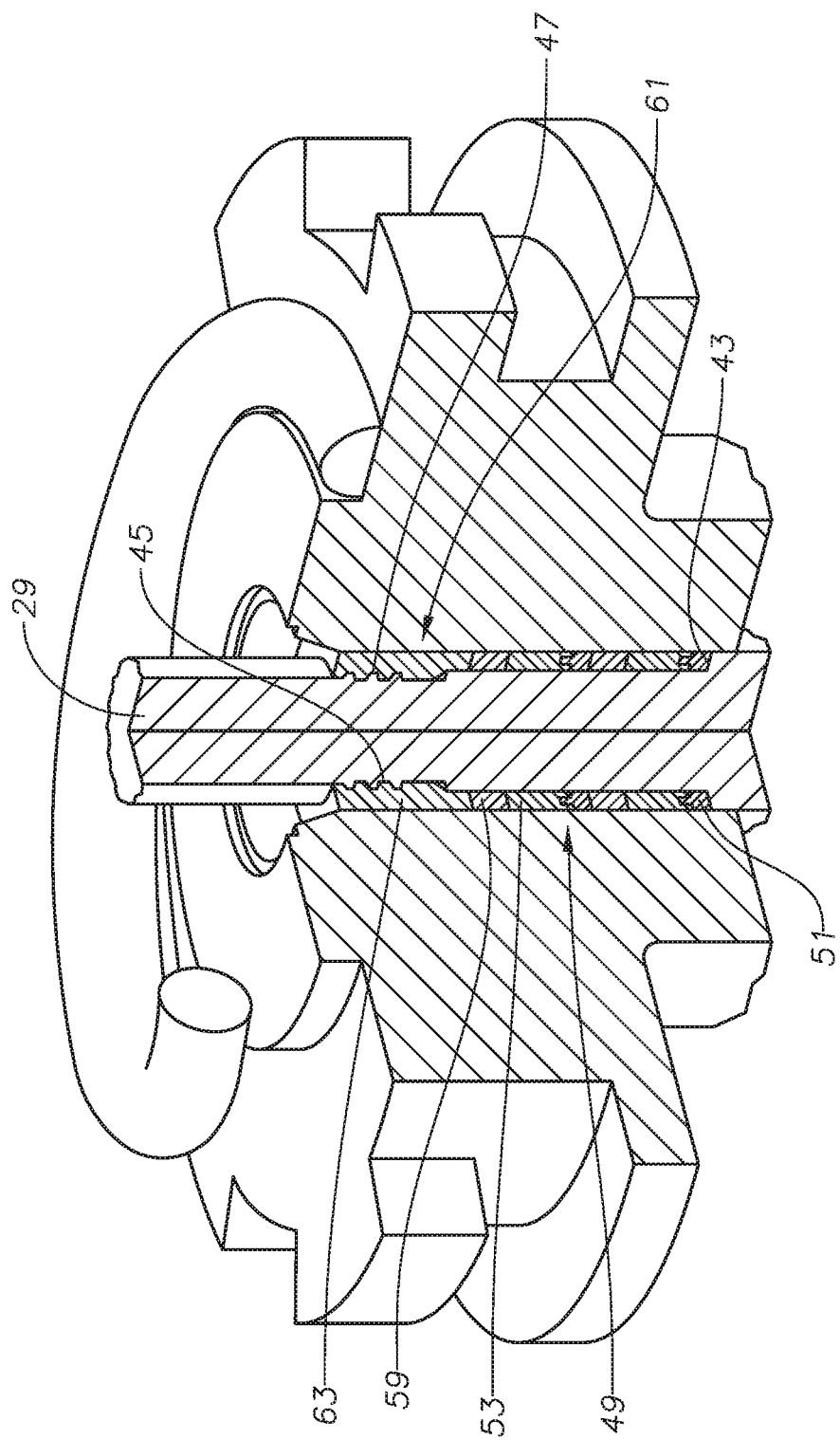
FIG. 5 is a detail quarter section view of a dynamic stem packing, in accordance with an alternate embodiment of this disclosure.

Standoff 51 extends into a channel between inner leg 55 and outer leg 57. Standoff 51 supports seal ring 53 and maintains the spacing of seal ring 53 between annular shoulder 43 and retainer ring 59. Retainer ring 59 is part of packing retainer assembly 61 of packing assembly 37. Packing retainer assembly 61 also includes retainer nut 63. Retainer ring 59 can be located between retainer nut 63 and an end of seal ring 53. Both retainer ring 59 and retainer nut 63 can have a largest outer diameter that is less than the inner diameter of stem opening 35 so that as valve stem 29 moves through stem opening 35, there is sufficient space within stem opening 35 to allow packing assembly 37 to move with valve stem 29 within stem opening 35. Retainer assembly 61 can be recessed within bonnet 33 so that the upper end of retainer assembly 61 is below an upper end of bonnet 33 (FIG. 5). Such an arrangement allows for valve stem 29 to be shorter than some current valve stems because downstop 41 will have space to move farther towards valve body 13 than if retainer assembly 61 extended above bonnet 33.

Retainer nut 63 can be the element of packing assembly 37 that releasably secure packing assembly 37 to valve stem 29. In the example of FIG. 4, fluid pressure within stem opening 35 can enhance the seals formed by seal ring 53 and can energize seal ring 53. In such an embodiment, the axial distance between annular shoulder 43 and the bottom end surface of retainer nut 63 can be greater than the combined axial length of seal assembly 49 plus retainer ring 59. In alternate embodiments, packing retainer assembly 61 can energize seal assembly 49. In such embodiments, the lower end of packing retainer assembly 61 engages an end of seal assembly 49 and can apply and maintain sufficient axial force to seal assembly 49 to energize seal assembly 49.

Looking at FIG. 5, in certain embodiments, a second packing assembly 37 can be located at the portion of valve stem 29 with the reduced outer diameter. The second packing assembly 37 provides redundant sealing between valve stem 29 and stem opening 35. A second retainer ring 59 can be located between and axially separate the two packing assemblies 37.

Looking at FIG. 4, in order to provide redundant sealing between valve stem 29 and stem opening 35, annular seal 65 can circumscribing valve stem 29 and seal between packing retainer assembly 61 and valve stem 29. Annular seal 65 can be located in an annular groove 67 that is located on an inner diameter surface of retainer nut 63. Second annular seal 69 can circumscribe valve stem 29 and seal between packing retainer assembly 61 and stem opening 35.

Looking at FIGS. 3 and 6, cladding 71 can line the inner diameter surface of stem opening 35. In some current valve assemblies where the annular seals are secured to the valve assembly body, the annular space between the outer diameter of the valve stem and the stem opening can be larger than that space of the current disclosure. Therefore, the volume of cladding 71 required to line the inner diameter surface of stem opening 35 can be less than the volume of cladding required for some current valve assemblies. Reducing the volume of cladding can result in both time and cost savings.

In an example of operation, valve assembly 11 can be made part of a fluid flow system. As valve member 17 is moved between the open position and the closed position by valve stem 29 moving within stem opening 35 packing assembly 37 moves with valve stem 29 within stem opening 35. Packing assembly 37 is axially static relative to valve stem 29. If valve stem 29 moves axially to move valve member 17 between the open position and the closed position, packing assembly 37 is dynamic and moves axially relative to valve assembly body, such as bonnet 33. If valve stem 29 rotates abut axis 25 to move valve member 17 between the open position and the closed position, packing assembly 37 can either rotate relative to valve assembly body, rotate relative to valve stem 29, or rotate relative to both valve assembly body and valve stem 29.

The systems and methods described herein, therefore, are well adapted to carry out the objects and attain the ends and advantages mentioned, as well as others inherent therein. While example embodiments of the disclosure have been given for purposes of disclosure, numerous changes exist in the details of procedures for accomplishing the desired results. These and other similar modifications will readily suggest themselves to those skilled in the art, and are intended to be encompassed within the disclosure and the scope of the appended claims.

What is claimed is:

1. A valve assembly having a dynamic stem seal assembly comprising:
   a valve stem for moving a valve member from a closed position to an open position, the valve stem extending through a stem opening of a valve assembly body and having an axis;
   a packing assembly sealing between the valve stem and the stem opening, the packing assembly comprising:
   a seal assembly circumscribing the valve stem;
   a packing retainer assembly releasably secured to the valve stem above the seal assembly to hold the seal assembly within the stem opening; and wherein
   the packing assembly is axially static relative to the valve stem when the valve stem moves the valve member axially between the closed position and the open position.

2. The valve assembly according to claim 1, wherein the seal assembly includes a standoff that engages an annular shoulder of the valve stem, and a seal ring with an inner leg and outer leg, the standoff extending into a channel between the inner leg and the outer leg.

3. The valve assembly according to claim 2, wherein the inner leg is biased radially inward to sealingly engage an outer diameter of the valve stem, and the outer leg is biased radially outward to sealingly engage an inner diameter of the stem opening.

4. The valve assembly according to claim 1, wherein inner diameter threads of the packing retainer assembly engage outer diameter threads of the valve stem.

5. The valve assembly according to claim 1, wherein the packing assembly further comprises a standoff positioned on a shoulder of the valve stem.

6. The valve assembly according to claim 1, wherein the packing assembly rotates about the axis with the valve stem.

7. The valve assembly according to claim 1, wherein the packing assembly is static relative to the stem opening as the valve stem rotates about the axis.

8. The valve assembly according to claim 1, further comprising a second packing assembly located at a portion of the valve stem with a reduced outer diameter, the second packing assembly redundantly sealing between the valve stem and the stem opening.

9. The valve assembly according to claim 1, further comprising an annular seal, the annular seal circumscribing the valve stem and sealing between the packing retainer assembly and one of the valve stem and the stem opening.

10. The valve assembly according to claim 9, further comprising a second annular seal, the second annular seal circumscribing the valve stem and sealing between the packing retainer assembly and the other of the valve stem and the stem opening.

11. A valve assembly having a dynamic stem seal assembly comprising:
    a valve stem extending through a stem opening of a bonnet and having an axis;
    a packing assembly sealing between the valve stem and the stem opening, the packing assembly comprising:
    a seal assembly circumscribing the valve stem;
    a packing retainer assembly releasably secured to the valve stem to hold the seal assembly within the stem opening when the packing retainer is secured to the valve stem; and wherein the seal assembly is positioned axially between an upward facing annular shoulder of the valve stem and an end surface of the packing retainer assembly;

a largest outer diameter of the packing retainer assembly is less than the inner diameter of the stem opening; and the packing assembly is axially static relative to the valve stem.

12. The valve assembly according to claim 11, wherein the seal assembly includes a standoff that engages an annular shoulder of the valve stem, and a seal ring that has an inner leg and outer leg, the standoff extending into a channel between the inner leg and the outer leg.

13. The valve assembly according to claim 11, wherein inner diameter threads of the packing retainer assembly engage outer diameter threads of the valve stem.

14. The valve assembly according to claim 11, further comprising a second packing assembly located at a portion of the valve stem with a reduced outer diameter, the second packing assembly redundantly sealing between the valve stem and the stem opening.

15. The valve assembly according to claim 11, further comprising:

an annular seal, the annular seal circumscribing the valve stem and sealing between the packing retainer assembly and the valve stem; and a second annular seal, the second annular seal circumscribing the valve stem and sealing between the packing retainer assembly and the stem opening.

16. A method for sealing an annular space within a valve assembly with a dynamic stem seal assembly, the method comprising:

providing a packing assembly for sealing between a valve stem and a stem opening of a valve assembly body, the valve stem extending through the stem opening and having an axis;

circumscribing the valve stem of the valve assembly with a seal assembly of the packing assembly; and releasably securing a packing retainer assembly of the packing assembly to the valve stem so that the packing assembly is retained axially static relative to the valve stem, and within the stem opening, when the packing retainer is secured to the valve stem, as the valve stem moves a valve member from a closed position to an open position.

17. The method according to claim 16, wherein the seal assembly includes a standoff that engages an annular shoulder of the valve stem, and a seal ring with an inner leg and outer leg, the standoff extending into a channel between the inner leg and the outer leg, the method further comprising sealingly engaging an outer diameter of the valve stem with the inner leg that is biased radially inward, and sealingly engaging an inner diameter of the stem opening with the outer leg that is biased radially outward to.

18. The method according to claim 16, wherein the step of releasably securing the packing retainer assembly of the packing assembly to the valve stem includes engaging inner diameter threads of the packing retainer assembly with outer diameter threads of the valve stem.

19. The method according to claim 16, further comprising locating a second packing assembly at a portion of the valve stem with a reduced outer diameter, the second packing assembly redundantly sealing between the valve stem and the stem opening.

20. The method according to claim 16, further comprising circumscribing the valve stem and sealing between the packing retainer assembly and the valve stem with an annular seal, and circumscribing the valve stem and sealing between the packing retainer assembly and the stem opening with a second annular seal.

* * * * *